Figure 1:
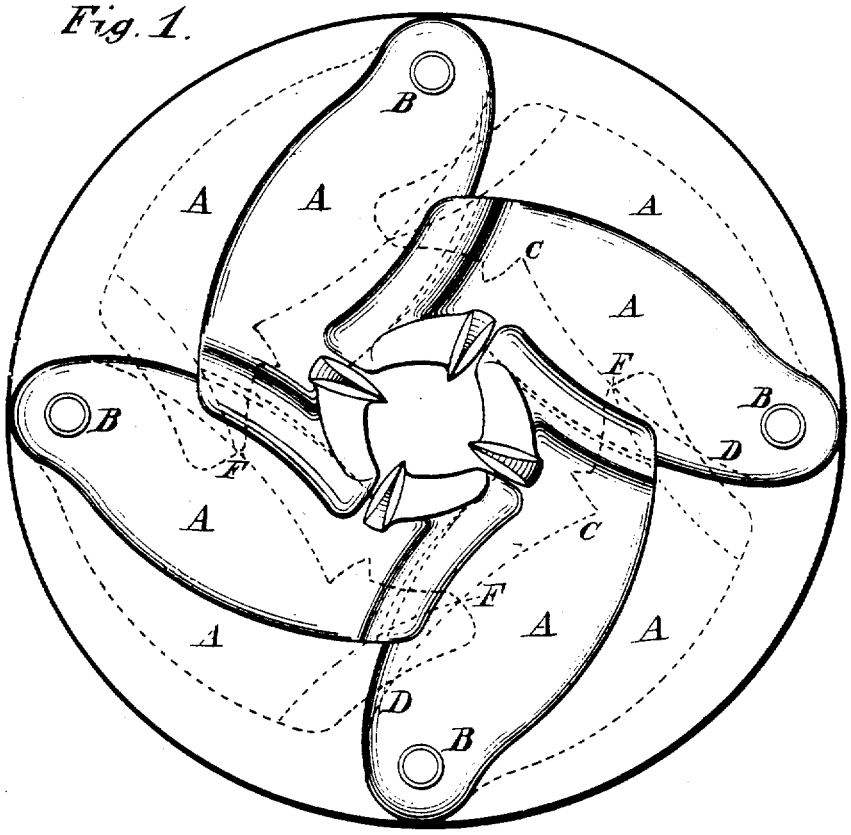

J. E. LEWIS.

MECHANICAL MOVEMENT.

No. 7,617. Reissued April 17, 1877.

WITNESSES:

Edward H. Hill.
E. H. Eastman.

INVENTOR:

J. Edwin Lewis.
BY HIS ATTY.: James G. Arnold.

N. PETERS, PHOTO-LITHOGRAPHER, WASHINGTON, D. C.

UNITED STATES PATENT OFFICE.

J. EDWIN LEWIS, OF WORCESTER, MASSACHUSETTS.

IMPROVEMENT IN MECHANICAL MOVEMENTS.

Specification forming part of Letters Patent No. 178,536, dated June 13, 1876; reissue No. 7,617, dated April 17, 1877; application filed March 26, 1877.

DIVISION B.

*To all whom it may concern:*

Be it known that I, J. EDWIN LEWIS, of the city and county of Worcester, and State of Massachusetts, have invented a certain new and useful Mechanical Movement; and I hereby declare the following to be a description of my invention sufficiently full, clear, and exact to enable others skilled in the art to which it appertains to make and use the same, reference being had to the accompanying drawings, which form a part of this specification.

The nature of my invention consists in a series of concentrically-pivoted levers, with such form of adjacent surfaces in contact with each other that they shall be coacting, and a motion or force applied to one shall be communicated to all the others, and is applicable in the mechanic arts in a great many cases where simultaneously expanding or contracting parts are required.

In the accompanying drawings, Figure 1 shows a series of four levers embodying my invention, which is applicable to any series of levers of three or more in number.

The action of any two adjacent levers being similar to that of any other two, the following description of the construction and operation of two will apply to any.

The levers A A are pivoted at B, and the surface C D of each acts on the part F of the next, when the levers are closing, and when opening the reverse is the case. The part F sliding along C D imparts the force or motion.

In Fig. 1 the part F is made with a short curve, and might be reduced to a point or corner, which may be best in some forms of appliance of my invention, while for the more common forms I prefer the larger curves, as less liable to wear.

In operation any force or motion applied to one lever is communicated to the next, and from that to another, through the whole series, whether it be to close or open the free end of the levers, and this is the case throughout the range of motions, as shown by their positions in broken lines.

It is evident that the forms of the free ends may be made to suit the desired use of the levers without affecting the principles of their action.

Some of the many uses to which my invention may be applied are for chucks, screw-tools, expanding pulleys, spreaders, corn-shellers, and most all the various mechanisms where the parts are desired to act simultaneously.

What I claim as new, and desire to secure by Letters Patent, is—

The mechanical movement described, consisting of the pivoted levers, having coacting surfaces C, D, and F, whereby they are made to act simultaneously, substantially as and for the purposes set forth.

In testimony whereof I do set my hand this 13th day of March, A. D. 1877.

J. E. LEWIS.

Witnesses:

JAS. G. ARNOLD,
JOSEPH MASON.